April 25, 1950     P. M. TERLIZZI ET AL     2,505,014
DRY CELL HAVING A PLASTIC CASE
Filed April 25, 1946
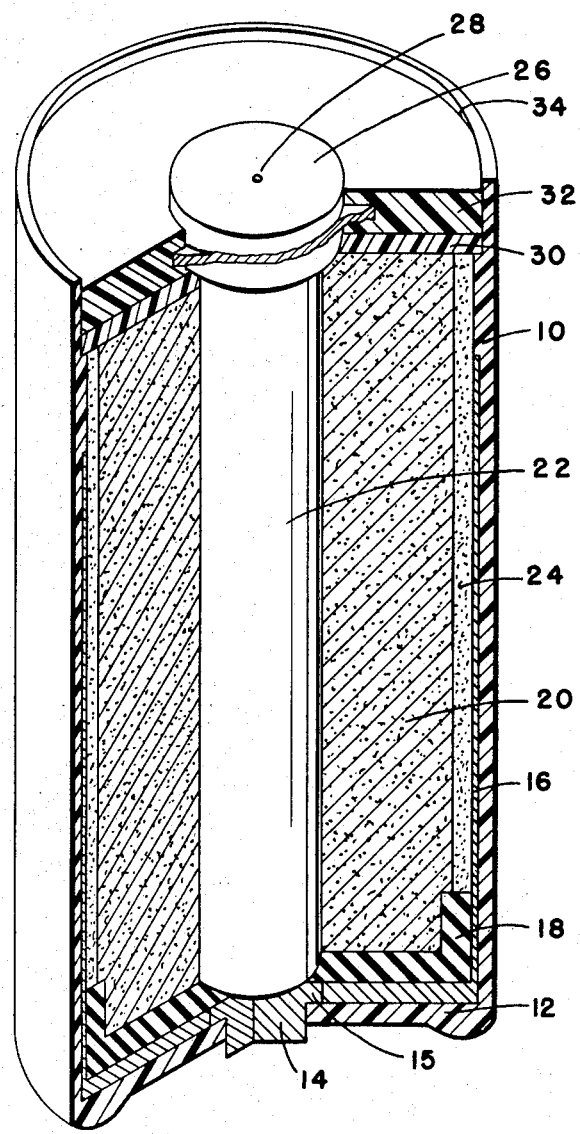
INVENTORS
VINCENT F. SAITTA
PAUL M. TERLIZZI
BY
Attorney Patented Apr. 25, 1950

2,505,014

UNITED STATES PATENT OFFICE 2,505,014

DRY CELL HAVING A PLASTIC CASE

Paul M. Terlizzi, Washington, D. C., and Vincent F. Saitta, United States Navy

Application April 25, 1946, Serial No. 664,872

2 Claims. (Cl. 136—132)

(Granted under the act of March 3, 1883, as amended April 30, 1928; 370 O. G. 757)

This invention relates to the construction of a dry cell and in particular to the providing of a leak-proof, gas permeable, plastic case for such dry cell.

It is known in the art to provide dry cells with plastic cases which are corrosion resistant and leak proof. But it has not been customary to provide dry cells with cases which are porous or sufficiently permeable to permit the escape of gases which result from the chemical reactions taking place within the cell. The plastic cases, in use at present, are of relatively heavy wall construction or are reinforced by elements such as metallic wire, in order to contain the gases developed within the case without bulging or rupture thereof.

Since applicants' case is porous it permits the gases developed to escape through the body of the plastic. It is, therefore, not of such heavy construction as the present art cases and at the same time it is corrosion resistant and leak-proof.

It is, therefore, an object of this invention to provide a porous plastic case or jacket for a dry cell which is adapted to permit the escape of gases developed by the reactions taking place in the cell and is resistant to the corrosive action of the products thereof.

It is also an object of this invention to provide a porous plastic case or jacket which by solvent fusing or welding of joints therein is rendered leak-proof, and It is an additional object of this invention to provide a plastic jacket for a cell which is of relatively light construction and capable of economic manufacture.

Other objects of invention will be apparent from the following description and drawing which illustrates a preferred embodiment of the invention, to which (drawing), for a clearer conception of the invention, reference is now made.

The numeral 10 represents a porous plastic cup, the bottom 12 of which at its center is provided with an opening to receive zinc contact button 14. This button is flanged as at 15 to project over the edge of the opening in order to retain the button securely with respect to the cup bottom and to contact the zinc lining 16 with which the cup is provided. Zinc lining 16 is applied to the internal surface (side wall and bottom) by spraying, hot dipping or by electrolytical deposition. Thereby an intimate contact between the zinc and cup walls is made and the presence of water between the zinc and cup walls with its corrosive action on the zinc is eliminated. Resting on the bottom of the zinc lining is insulating support 18 which is adapted to separate bobbin 20 from the zinc electrode. Bobbin 20 comprises carbon pencil 22 and a conventional depolarizing mixture which is compacted therearound. Paste electrolyte 24 is positioned between the bobbin and the zinc lined side walls of the plastic cup.

Closure of the plastic cup is effected by means of porous plastic collar 30 which fits tightly around carbon pencil 22 and is adapted to support porous plastic cover 32. The latter is sealed with respect to the cup side walls by means of a solvent of the plastic, as at 34. By this method of sealing the plastic cover is bonded to and forms substantially an integral part of the cup and at its juncture with the sidewalls is leakproof with respect to creepage of the electrolyte or the products of the chemical reactions taking place within the cell. Metallic cap 26 is molded into plastic cover 32 on the center axis thereof and is adapted to tightly fit the end of carbon pencil 22. Creepage of the electrolyte around the cap is thereby eliminated.

Plastic collar 30 rests upon the electrolyte of the bobbin and the paste electrolyte. No space is provided for the accumulation of gas as in the case of conventional dry cells. There is no need of such space in this cell since any gas generated by the chemical reactions within the cell escapes through the porous structure of the plastic. The cell of this invention is therefor free from the defect in which internal gas pressure lifts the sealing compound with the resultant leakage of the electrolyte out of the cell and the deleterious effect on adjacent cells or metal container.

A preferred porous plastic material for making the cup 10 and cover 32 is composed of three or four layers of glass fiber, each layer being tightly woven and being about $\frac{1}{32}$ inch thick. The composite mat is impregnated by application of heat and pressure with a resin or varnish which reduces the porosity of the glass fiber mat while adding rigidity thereto.

Glass fiber suitable for this purpose has been known for a number of years and is manufactured by the Owens-Corning Glass Works under the trade name of "Fiberglas" with various types of weaves, a close woven type similar to No. 184–A–14 being preferable. Fabrics of glass fibers of close woven type are described in U. S. Patent Number 1,636,511 issued to Carl Hering on July 19, 1927. A suitable resin or varnish is "Selectron" No. 5003 or No. 5007 although any other suitable material may be employed. Selectron resins are described on pages 1 to 8 of "Technical Report as Revised February 1, 1946, on Selectron 5000 Resins" of the Pittsburgh Plate Glass Company, Pittsburgh, Pennsylvania.

The degree of impregnation of the glass fiber mat is dependent on the degree of porosity desired in the final product. It has been found that varnish or resin in an amount between 5% and 10% of the weight of the glass fiber mat should be used as this will give sufficient rigidity to the mat while reducing the initial porosity to a degree permitting hydrogen gas evolved in the battery to escape at a slow rate.

While the cup 10 may be made of the fiber glass material, the zinc lining 16 tends to prevent escape of the hydrogen gas so that, as a practical matter, the cup may be made of a rigid non-porous plastic and only the collar 30 and cover 32 need be porous for the purpose disclosed. As described above, the impregnated porous cover 32 may be either heat or solvent sealed to the plastic cup 10.

While the foregoing description has been drawn to a porous plastic cup for a dry cell it is not desired to be limited to a particular type of plastic such as thermo-setting or thermo-plastic. Either type provided it is sufficiently porous and possessed of the necessary mechanical strength and electrical resistance at the operating temperatures is satisfactory and is within the spirit and scope of the invention to the extent as defined by the herewith appended claims.

In making a preferred embodiment of the present invention the desired quantity of paste electrolyte is placed within the cup 10, then bobbin 20 and pencil 22 are forced into contact with plate 18. This causes the paste to flow around bobbin 20 to form the lining of paste as shown at 24. Thereafter heat is applied until the paste is gelatinized.

The contacts 14 and 26 are molded into the base 12 and cover 32 respectively and the upper walls of cup 10 are sealed at 34 to cover 32 preferably by means of a solvent for the plastic used to form the members 10, 12, 30, and 32. These members are made of a porous plastic material having qualities that permit the axhalation of accumulated gases through the material, but prevent the escape of liquids and solids therethrough.

The invention described herein may be manufactured and used by or for the Government of the United States of America for governmental purposes without the payment of any royalty thereon or therefor.

We claim:
1. In a dry cell, a sealed plastic outer container enclosing the contents of said cell without air space therein, said container comprising a cup member and a cover member integrally sealed together; said cup member and said cover member being made of a porous plastic material having the characteristics that prevent the escape of solids and liquids and that permit the exhalation of gases therethrough; a first electrode contact member molded into the base of said cup member, and a second electrode contact member molded into said cover member, said contact members being arranged in cooperating relationship with said container and with said contents.

2. In a dry cell, a sealed outer container enclosing the contents of said cell without air space therein; a pair of electrode contact members molded therein in cooperating relationship with said container and with said contents; a substantial portion of said container being arranged to have its exterior surface exposed to the atmosphere; said portion being made of a porous plastic material having the characteristics that prevent the escape of solids and liquids and that permit the exhalation of gases therethrough.

PAUL M. TERLIZZI.
VINCENT F. SAITTA.

REFERENCES CITED

The following references are of record in the file of this patent:

UNITED STATES PATENTS

| Number | Name | Date |
|---|---|---|
| 378,122 | Walter et al. | Feb. 21, 1888 |
| 1,490,455 | Combs | Apr. 15, 1924 |
| 1,711,739 | Marsal | May 7, 1929 |
| 1,737,188 | Currie | Nov. 26, 1929 |
| 1,739,388 | Dexter | Dec. 10, 1929 |
| 2,307,763 | Deibel | Jan. 12, 1943 |
| 2,411,272 | Keller | Nov. 19, 1946 |
| 2,461,534 | Ellis | Feb. 15, 1949 |

FOREIGN PATENTS

| Number | Country | Date |
|---|---|---|
| 129,423 | Great Britain | July 8, 1919 |
| 271,496 | Great Britain | Sept. 29, 1927 |

OTHER REFERENCES

Simpkins, Modern Plastics, October 1945, pages 149, 150.